United States Patent
Girgensohn et al.

(10) Patent No.: US 8,089,563 B2
(45) Date of Patent: Jan. 3, 2012

(54) METHOD AND SYSTEM FOR ANALYZING FIXED-CAMERA VIDEO VIA THE SELECTION, VISUALIZATION, AND INTERACTION WITH STORYBOARD KEYFRAMES

(75) Inventors: Andreas Girgensohn, Palo Alto, CA (US); Frank M. Shipman, College Station, TX (US); Lynn Wilcox, Palo Alto, CA (US); Donald G. Kimber, Foster City, CA (US)

(73) Assignee: Fuji Xerox Co., Ltd., Tokyo (JP)

( * ) Notice: Subject to any disclaimer, the term of this patent is extended or adjusted under 35 U.S.C. 154(b) by 1695 days.

(21) Appl. No.: 11/324,557

(22) Filed: Jan. 3, 2006

(65) Prior Publication Data
US 2006/0284978 A1   Dec. 21, 2006

Related U.S. Application Data

(60) Provisional application No. 60/691,830, filed on Jun. 17, 2005, provisional application No. 60/691,983, filed on Jun. 17, 2005, provisional application No. 60/691,899, filed on Jun. 17, 2005.

(51) Int. Cl.
*H04N 5/14* (2006.01)
*H04N 7/18* (2006.01)
*G06K 9/34* (2006.01)

(52) U.S. Cl. .................. 348/700; 348/159; 382/173
(58) Field of Classification Search .................. 348/700; 382/103, 107, 173
See application file for complete search history.

(56) References Cited

U.S. PATENT DOCUMENTS

| | | | |
|---|---|---|---|
| 5,136,655 A | 8/1992 | Bronson | |
| 5,655,058 A | 8/1997 | Balasubramanian et al. | |
| 5,680,558 A | 10/1997 | Hatanaka et al. | |
| 5,708,767 A | 1/1998 | Yeo et al. | |

(Continued)

FOREIGN PATENT DOCUMENTS

WO    WO 03084249 A1 * 10/2003

OTHER PUBLICATIONS

Kumar V., et al., "Metadata Visualization for Digital Libraries: Interactive Timeline Editing and Review." Proceedings of the 3rd ACM Conference on Digital Libraries, pp. 126-133 (1998).

(Continued)

*Primary Examiner* — John M Villecco
(74) *Attorney, Agent, or Firm* — Morgan, Lewis & Bockius LLP

(57) ABSTRACT

Techniques for generating a storyboard are disclosed. In one embodiment of the invention the storyboard is comprised of videos from one or more cameras based on the identification of activity in the video. Various embodiments of the invention include an assessment of the importance of the activity, the creation of a storyboard presentation based on importance and interaction techniques for seeing more details or alternate views of the video. In one embodiment, motion detection is used to determine activity in one or more synchronized video streams. Periods of activity are recognized and assigned importance assessments based on the activity, important locations in the video streams, and events from other sensors. In different embodiments, the interface consists of a storyboard and a map.

31 Claims, 15 Drawing Sheets
(7 of 15 Drawing Sheet(s) Filed in Color)

U.S. PATENT DOCUMENTS

| | | | | |
|---|---|---|---|---|
| 5,805,733 | A * | 9/1998 | Wang et al. | 382/232 |
| 6,366,296 | B1 | 4/2002 | Boreczky et al. | |
| 6,535,639 | B1 | 3/2003 | Uchihachi et al. | |
| 6,807,361 | B1 | 10/2004 | Girgensohn et al. | |
| 6,842,197 | B1 * | 1/2005 | Llach-Pinsach et al. | 348/700 |
| 6,963,378 | B2 | 11/2005 | Li et al. | 348/700 |
| 7,027,509 | B2 * | 4/2006 | Jun et al. | 375/240.16 |
| 7,035,435 | B2 * | 4/2006 | Li et al. | 382/107 |
| 7,110,458 | B2 * | 9/2006 | Divakaran et al. | 375/240.25 |
| 7,143,083 | B2 | 11/2006 | Carlbom et al. | |
| 7,424,150 | B2 * | 9/2008 | Cooper et al. | 382/173 |
| 7,474,331 | B2 * | 1/2009 | Li et al. | 348/159 |
| 7,606,462 | B2 * | 10/2009 | Hosoda et al. | 386/52 |
| 7,702,014 | B1 * | 4/2010 | Kellock et al. | 375/240.08 |
| 7,703,044 | B2 * | 4/2010 | Graham | 715/838 |
| 2001/0020981 | A1 * | 9/2001 | Jun et al. | 348/426.1 |
| 2003/0161396 | A1 | 8/2003 | Foote et al. | |
| 2003/0189588 | A1 | 10/2003 | Girgensohn et al. | |
| 2003/0197731 | A1 | 10/2003 | Chiu et al. | |
| 2004/0187078 | A1 * | 9/2004 | Girgensohn | 715/517 |
| 2006/0078047 | A1 * | 4/2006 | Shu et al. | 375/240.01 |

OTHER PUBLICATIONS

Yeung, M., et al., "Video Visualization for Compact Presentation and Fast Browsing of Pictorial Content," IEEE Trans. Circuits and Sys. For Video Tech., vol. 7, No. 5 pp. 771-785 (Oct. 1997).

Demirdjian "Activity Maps for Location-Aware Computing," In Proceedings of IEEE Workshop on applications of Computer Vision (WACV2002), Orlando, Florida (Dec. 2002).

Larson et al., "An exploratory look at supermarket shopping paths," The Wharton School, The University of Pennsylvania, Philadelphia, http://www.searchlores.org/realicra/PT_1006.pdf (Dec. 9, 2005).

Pingali et al., "Multimedia Retrieval through Spatio-Temporal Activity Maps," Proceedings of the ACM Multimedia, pp. 129-136, Ottawa (Sep. 2001).

Porikli, F., "Multi-Camera Surveillance: Object-Based Summarization Approach," Mitsubishi Electric Research Laboratories, Inc., https://www.merfl.com/reports/docs/TR2003-145.pdf (Mar. 2004).

Santini, S. "Analysis of traffic flow in urban areas using web cameras" Fifth IEEE Workshop on Applications of Computer Vision (WACV 2000) Palms Spring, CA (Dec. 2000).

Stauffer and Grimson, "Learning Patterns of Activity Using Real-Time Tracking, "IEEE Trans. Pattern Anal. Mach. Intell. 22(8): 747-757 (2000), http://people.csail.mit.edu/welg/papers/learning2000.pdf.

Xiang and Gong, "Activity based video content trajectory representation and segmentation," In Proc. British Machine Vision Conference (BMVC), pp. 177-186, Kingston, U.K. (Sep. 2004), http://www.dcs.qmul.ac.uk/~txiang/xiang_gong_bmvc04_segment_camera_ready.pdf.

"Tag Team: Tracking the Patterns of Supermarket Shoppers," Knowledge@Wharton, The Wharton School of the University of Pennsylvania (Jun. 1, 2005), http://knowledge.wharton.upenn.edu/articlepdf/1208.pdf?CFID=36967030&CFTOKEN=41348498&jsessionid=9a3085e52c58255c797c.

Topic: 6, "Analyxing InStore Shopping Patterns," Map Analysis, http://www.innovativegis.com/basis/MapAnalysis/Topic6/Topic6.pdf (accessed Sep. 11, 2007).

Boreczky, J., et al., "An Interactive Comic Book Presentation for Exploring Video," FX Palo Alto Laboratory, Inc. (1999).

Cheung, S., et al., "Robust Techniques for Background Subtraction in Urban Traffic Video," Center for Applied Scientific Computing (2004).

Girgensohn A., et al., "A Semi-Automatic Approach to Home Video Editing." In Proceedings of UIST '00, ACM Press, pp. 81-89 (2000).

Plaisant, C., et al., "Lifelines: Visualizing Personal Histories," University of Maryland, http://www.cs.umd.edu/projects/hcil (at least as early as Jun. 14, 2005).

Wildemuth, B., "How Fast is Too Fast? Evaluating Fast Forward Surrogates for Digital Video," Interaction Design Laboratory, Proceedings of the $3^{rd}$ ACM/IEEE-CS Joint Conference on Digital Libraries, University of North Carolina at Chapel Hill, pp. 221-230 (2003).

Zivkovic, Z., "Improved Adaptive Gaussian Mixture Model for Background Subtraction," Intelligent and Autonomous Systems Group, University of Amsterdam, The Netherlands (2004).

* cited by examiner

METHOD AND SYSTEM FOR ANALYZING FIXED-CAMERA VIDEO VIA THE SELECTION, VISUALIZATION, AND INTERACTION WITH STORYBOARD KEYFRAMES

PRIORITY CLAIM

This application claims priority under 35 U.S.C. 119(e) to U.S. Provisional Application No. 60/691,830, filed Jun. 17, 2005, entitled METHODS AND INTERFACES FOR EVENT TIMELINES AND LOGS OF VIDEO STREAMS, and to U.S. Provisional Application No. 60/691,983, filed Jun. 17, 2005, entitled METHODS AND INTERFACES FOR VISUALIZING ACTIVITY ACROSS VIDEO FRAMES IN AN ACTION KEYFRAME, and to U.S. Provisional Application No. 60/691,899, filed Jun. 17, 2005, entitled METHOD AND SYSTEM FOR ANALYZING FIXED-CAMERA VIDEO VIA THE SELECTION, VISUALIZATION, AND INTERACTION WITH STORYBOARD KEYFRAMES, each of which is incorporated herein by reference.

CROSS REFERENCE TO RELATED APPLICATIONS

This application is related to the following applications, which were filed of even date herewith:

(1) "Methods and Interfaces for Event Timelines and Logs of Synchronized Video Streams," by Andreas Girgensohn, et al., and (2) "Methods and Interfaces for Visualizing Activity across Video Frames in an Action Keyframe," by Andreas Girgensohn, et al.

BACKGROUND OF THE INVENTION

1. Field of the Invention

Algorithms and interfaces for the analysis of recorded video from multiple cameras in multiple locations are presented. Using these techniques a summary of video from multiple cameras can be used to create a storyboard of all activity with emphasis on events of importance. The summary can be used to access the recorded video.

2. Description of the Related Art

Video surveillance systems are common in commercial, industrial, and residential environments although limited human attention and the number of video streams constrains the cost efficiency and effectiveness of such systems. Identifying activity of interest within synchronized video streams from a set of security cameras is difficult due to the quantity of video data and the lack of authored metadata or indexing. Yet security personnel need to identify activities of interest and determine interrelationships between activities in different video streams. They must develop an understanding of the sequence of actions that led to or happened after a particular incident.

For example, a video security system in an office building continuously records activity from multiple cameras. If an explosion occurred in the building, security people would be asked to analyze data from the video cameras to determine the cause of the explosion. This would require searching through hours of data from multiple cameras before the time of the explosion to determine the cause.

Manga visual video summaries (see U.S. Pat. No. 6,535, 639) were originally designed to provide interactive storyboards for edited video, to work with unedited video and to support multiple synchronized streams of video. The original Manga summaries relied on a camera operator or video editor to switch among several cameras or video shots to break up the video into segments. Other video summaries have similar problems, Yeung, M., and Yeo, B-L., "Video Visualization for Compact Presentation and Fast Browsing of Pictorial Content," in IEEE Trans. Circuits and Sys. for Video Technology, Vol 7, No. 5, pp. 771-785, October 1997.

A number of different approaches for determining activity are given in Chueng, S.-C. S. and Kamath C. Robust Techniques for Background Subtraction in Urban Traffic Video. Video Communications and Image Processing, SPIE Electronic Imaging, San Jose, 2004. Keyframe piles are described in Girgensohn A., Boreczky J., Chiu P., Doherty J., Foote J., Golovchinsky G., Uchihashi S., and Wilcox L., A Semi-Automatic Approach to Home Video Editing. In Proceedings of UIST '00, ACM Press, pp. 81-89, 2000. Maps were used in the Space Time Browser to select video, see U.S. patent application Ser. No. 10/126,555, Publication Number 20030197731.

SUMMARY OF THE INVENTION

In this invention algorithms and interfaces are defined for the analysis of recorded video from multiple cameras in multiple locations. In one embodiment of the invention, a summary of video from multiple cameras provides a storyboard of all activity with emphasis on events of importance. The summary can be used to access the recorded video.

Manga visual video summaries have been extended. The extensions to the original work include techniques for locating periods of interesting activity within a video stream, methods for presenting a storyboard combining elements from multiple synchronized video streams, a new layout algorithm that preserves the connection between keyframe size and importance, and interface elements for selecting cameras and periods of interest.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Preferred embodiments of the present invention will be described in detail based on the following figures, wherein.

DETAILED DESCRIPTION OF THE INVENTION

Identifying Activity in Video

Two different approaches for determining activity are proposed. The first approach compares successive video frames and determines the pixels that change. The second approach models the background of the camera view and determines foreground pixels in every video frame. Both approaches look at the changed or foreground pixels and count them or determine the direction and speed of the overall motion.

Figure 7:
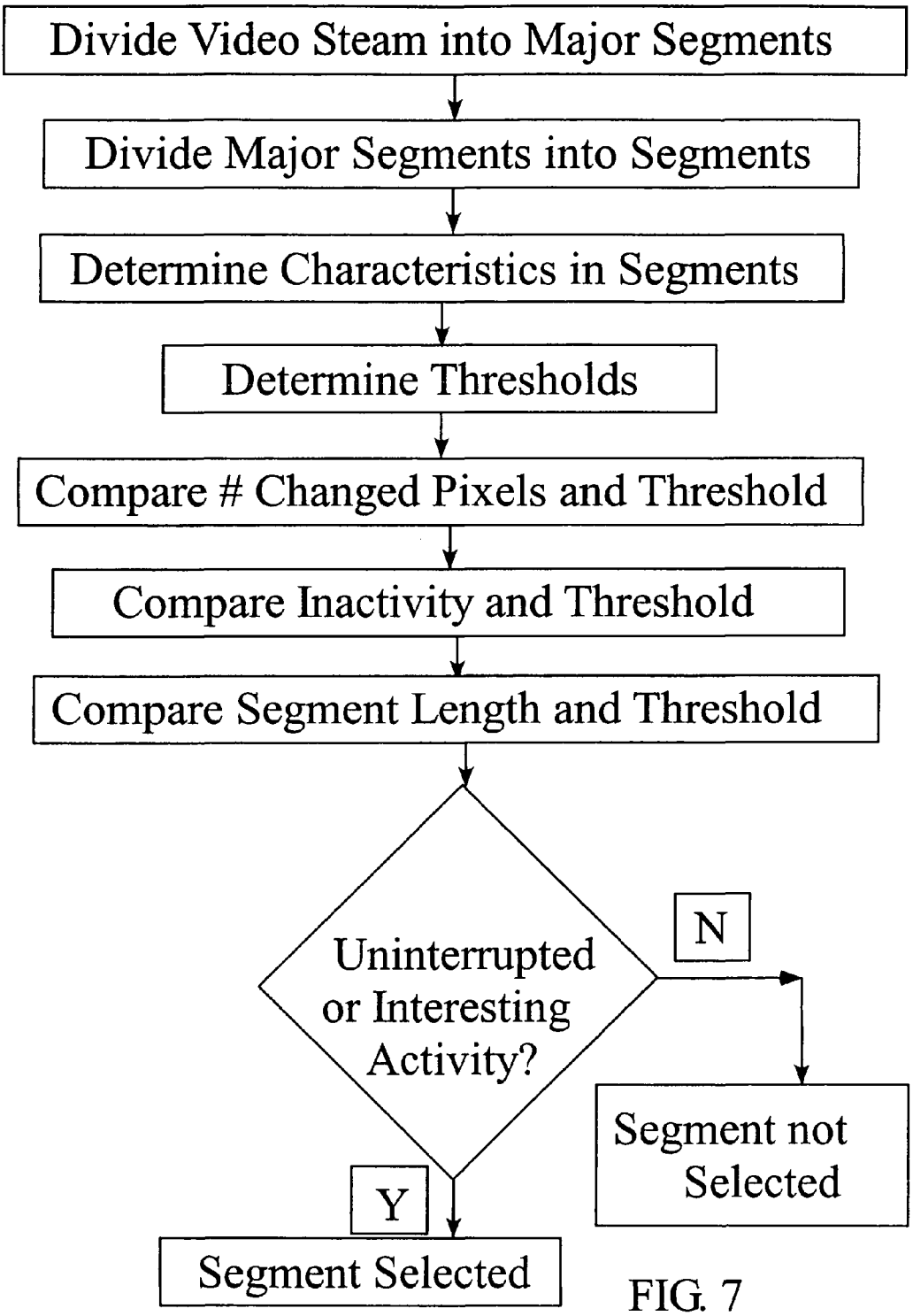
FIG. 7 shows a block diagram of the steps involved in selecting uninterrupted or interesting activity segments in a video stream.

Frames with sufficient activity are grouped into video segments with activity as outlined in FIG. 7. In the first step frames with major changes such as lights on or off are identified and activity segments are determined independently inside each of those major segments.

Activity is defined as the change in pixels between successive video frames or the change in foreground pixels. Importance is defined as the amount of activity in the video, or motion close to points of interest in the space being videotaped. Alternatively, importance can be defined by events from other techniques or sensors. Color is defined as the visible aspect of a representation caused by differing qualities of the light reflected or emitted by the representation. Color includes all colors of the spectrum and white, gray and black. Color code is the use of coloring a representation or part thereof for easy identification.

Figure 1:
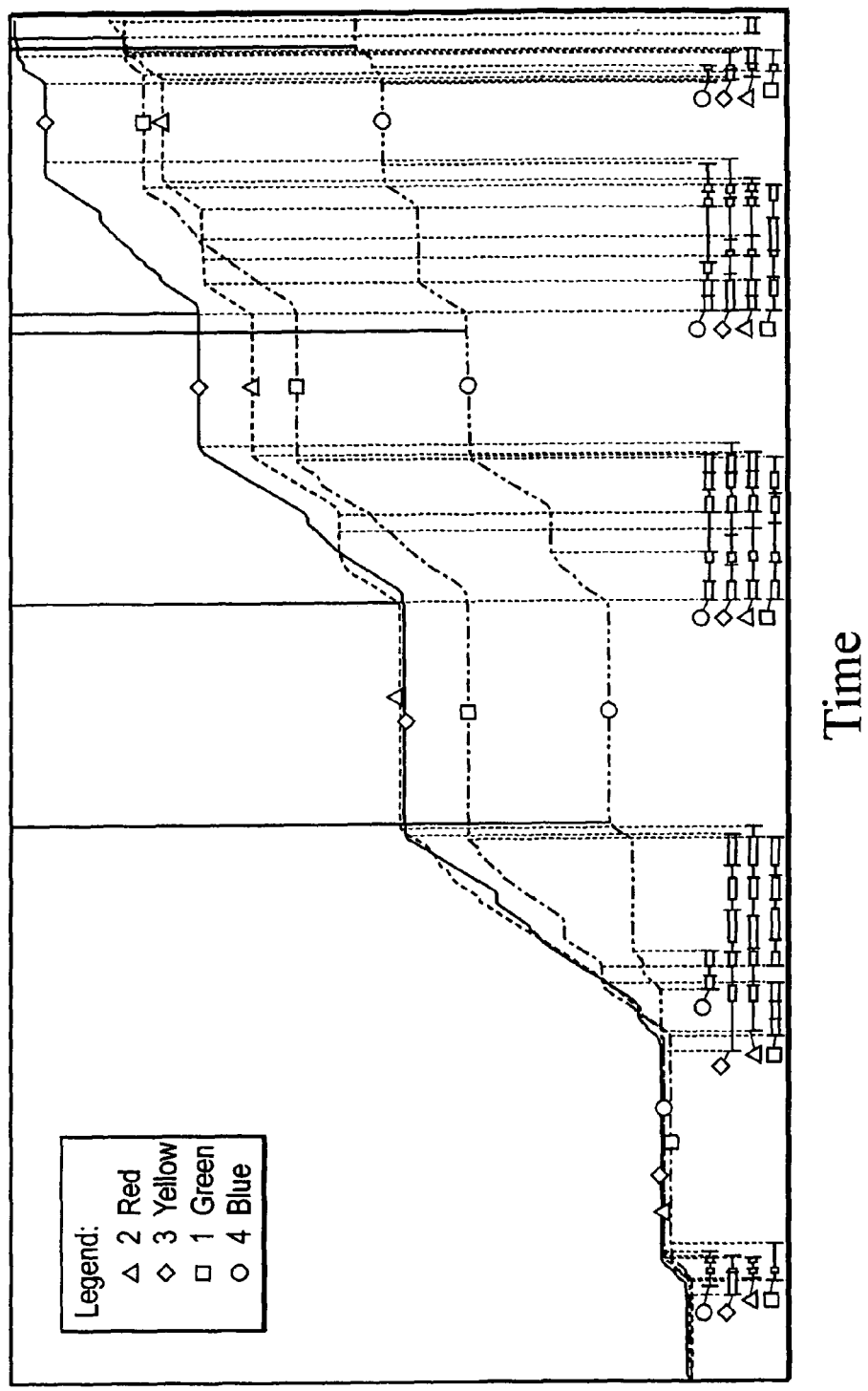
FIG. 1 shows an artists impression of FIG. 8, where the cumulative activity for four cameras where segments of activity are coded with symbols (□, ▲, ◊, ○) corresponding to colors (green, red, yellow, blue) indicate the source camera (1, 2, 3, 4) respectively.
Figure 8:
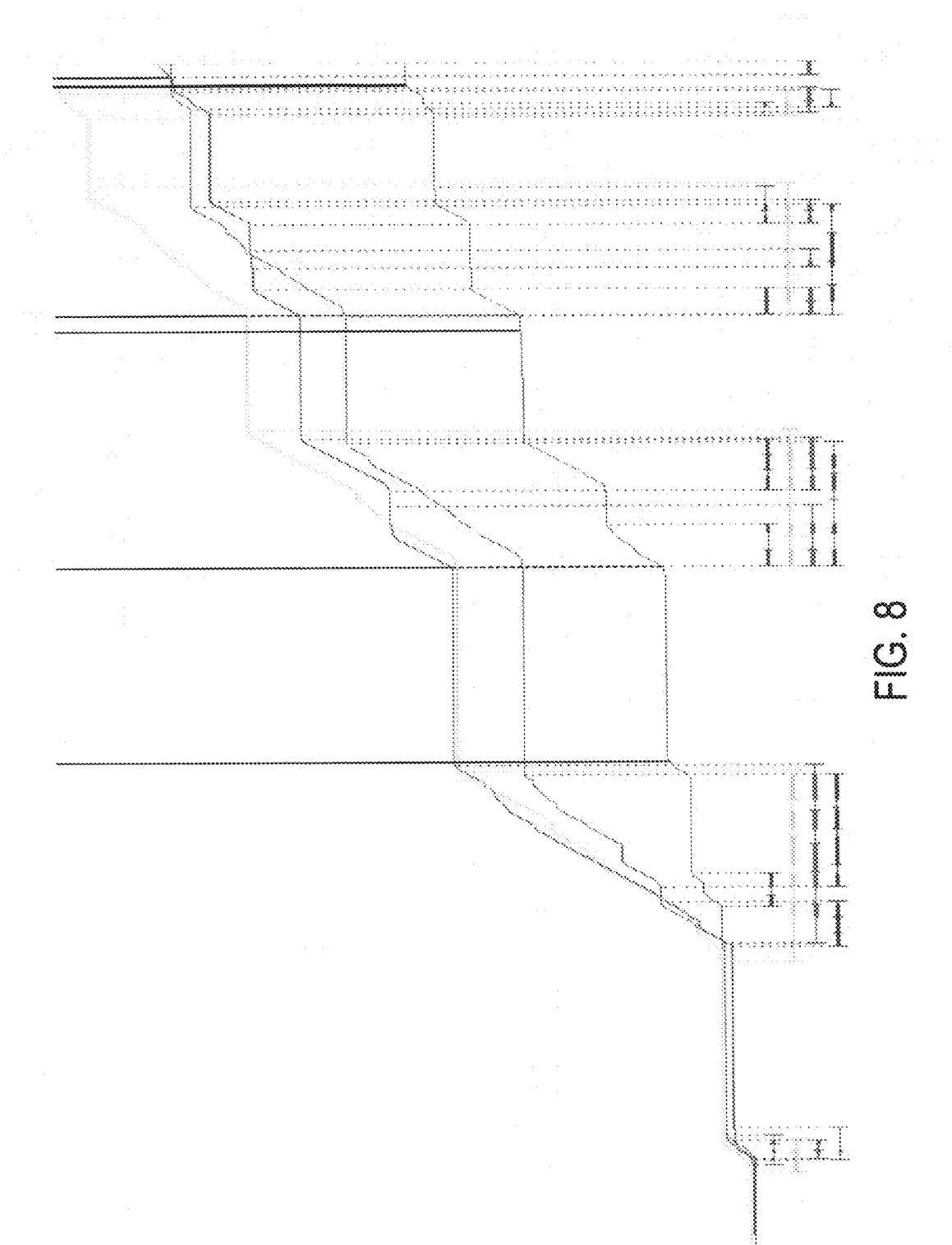
FIG. 8 shows the cumulative activity for four cameras.

FIG. 1 and FIG. 8 show the Cumulative activity for four cameras . Vertical black lines indicate major changes such as light on or off which are excluded as activity. Horizontal lines at the bottom indicate segments of activity which in FIG. 1 are coded with symbols (□, Δ, ◇, ○) corresponding to colors (green, red, yellow, blue) to indicate the source camera (1, 2, 3, 4) respectively. Short vertical lines subdivide activity segments into sub segments that are represented by a keyframe. Thick horizontal lines indicate the part of the sub segments lined up with sub segments from other cameras. FIGS. 1 and 8 are intended to visualize the inner workings of the algorithm and are not intended to be shown to security personnel.

Thresholds are experimentally determined for the minimum fraction of changed pixels to be considered activity, for the minimum pause in activity to start a new segment, and the minimum length of an activity segment to ignore video noise. Using those thresholds, periods of uninterrupted activity are grouped into activity segments. Segments separated by gaps of inactivity shorter than the minimum pause are merged. Activity segments that are shorter than the minimum length after merging are discarded. FIGS. 1 and 8 show the cumulative activity for four cameras and activity segments as horizontal lines delimited by longer vertical lines. Shorter vertical lines separate sub segments discussed below.

Assessing Importance of Activity

Importance can be assessed based on the amount of activity in the video, motion close to points of interest in the space being videotaped, and events from other techniques or sensors, e.g., face detection or Radio Frequency Identification (RFID). Importance can be computed by comparing the views of several cameras, e.g., to determine the three-dimensional distance of motion from a point of interest.

Creating a Storyboard

To create the storyboard, the video from one camera can be segmented into activity segments. Depending on the allocated space for the storyboard, longer activity segments are segmented into several sub segments based on the cumulative amount of activity. FIG. 7 shows a block diagram of the steps involved in an embodiment of the invention for identifying uninterrupted or interesting activity in a video stream. In one embodiment of the invention, the number of sub segments can be proportional to the square root of the cumulative amount of activity but other relationships (e.g., linear) can be used. Horizontal lines at the bottom of FIGS. 1 and 8 indicate segments of activity. Short vertical lines subdivide activity segments into sub segments that are visualized by a keyframe.

Figure 2:
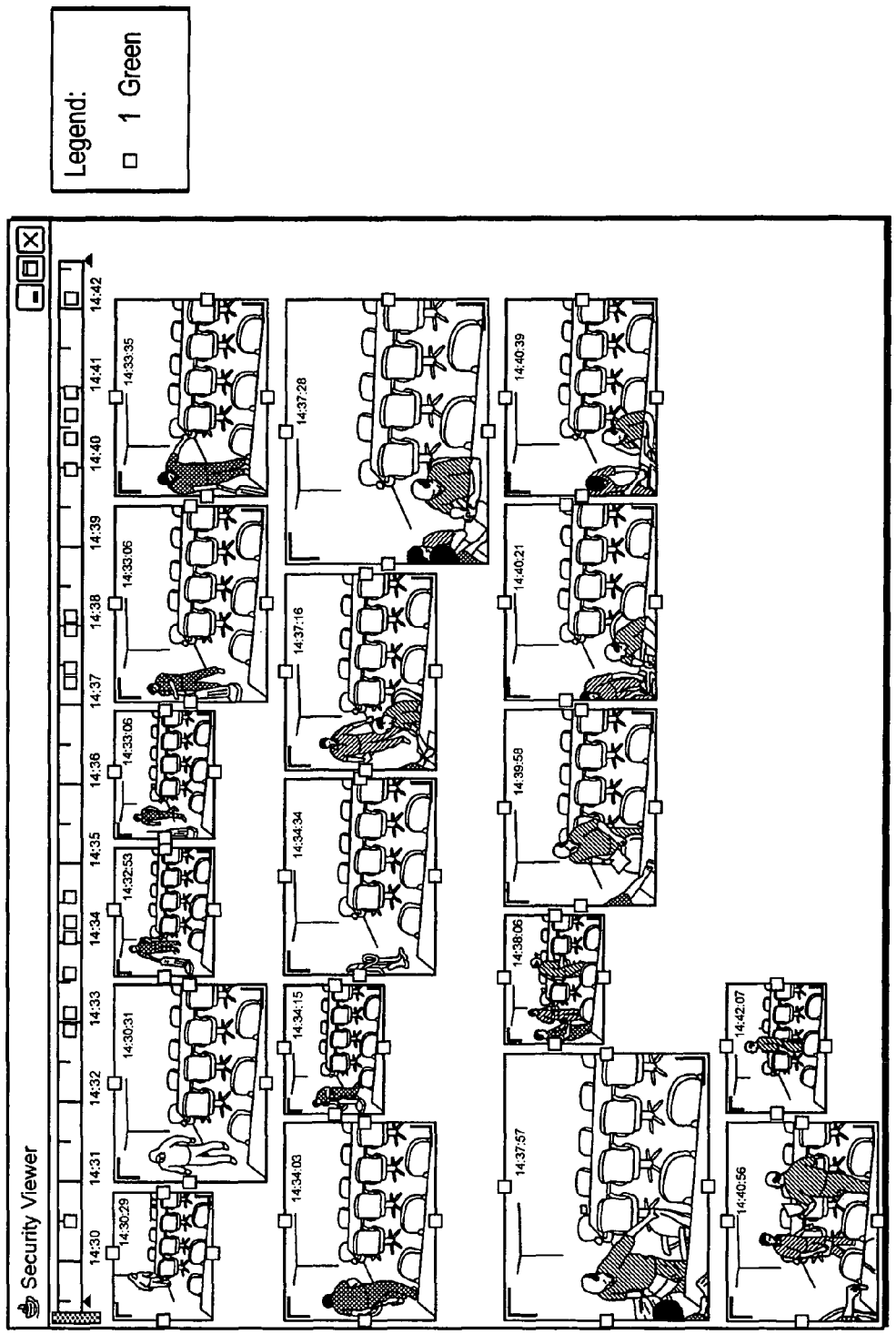
FIG. 2 shows an artists impression of FIG. 9, which illustrates a Manga storyboard summary from a single security camera where the keyframes are outlined and segments on the timeline are identified with the symbol (□) corresponding to the color green or source camera 1.
Figure 9:
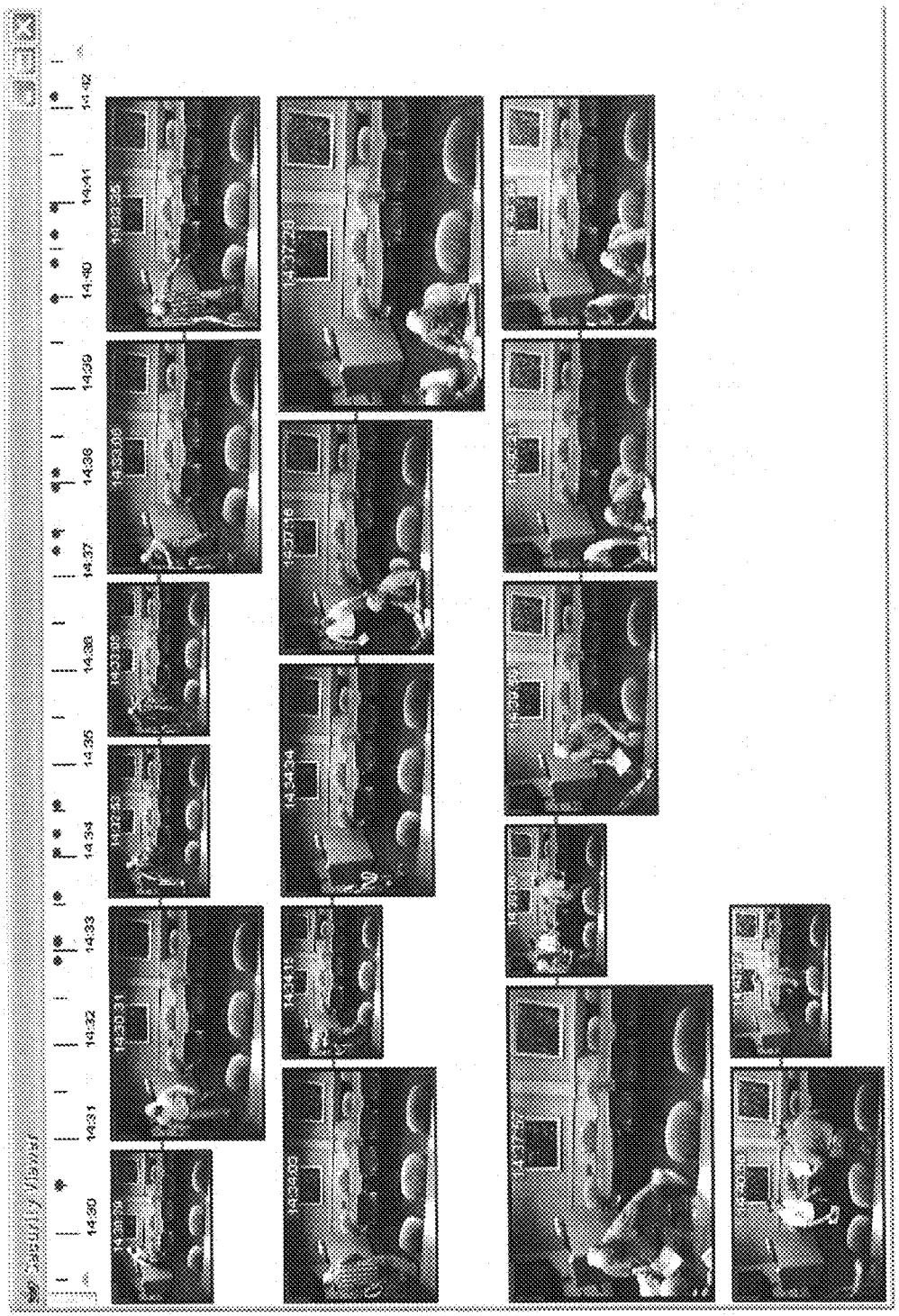
FIG. 9 illustrates a Manga storyboard summary from a single security camera where the keyframes are outlined and segments on the timeline are identified.

As with the previous Manga layout algorithms (see U.S. Pat. No. 6,535,639), the size of a keyframe visualizing a video segment can be proportional to the importance of the video segment. However, in security video applications, it can be necessary to accurately depict the importance so that the layout algorithm may not resize keyframes to produce a more compact display. FIG. 2 and FIG. 9 illustrate a Manga storyboard summary from a single security camera where the keyframes are outlined and segments on the timeline in FIG. 1 are identified with the symbol (□) corresponding to the color green to indicate source camera 1. In one embodiment of the invention, a packing algorithm different from that used in the previous Manga layout algorithm is used that inserts white space if the keyframes cannot be packed without gaps (see FIGS. 2 and 9).

Storyboards of Multiple Synchronized Video Streams

Figure 3:
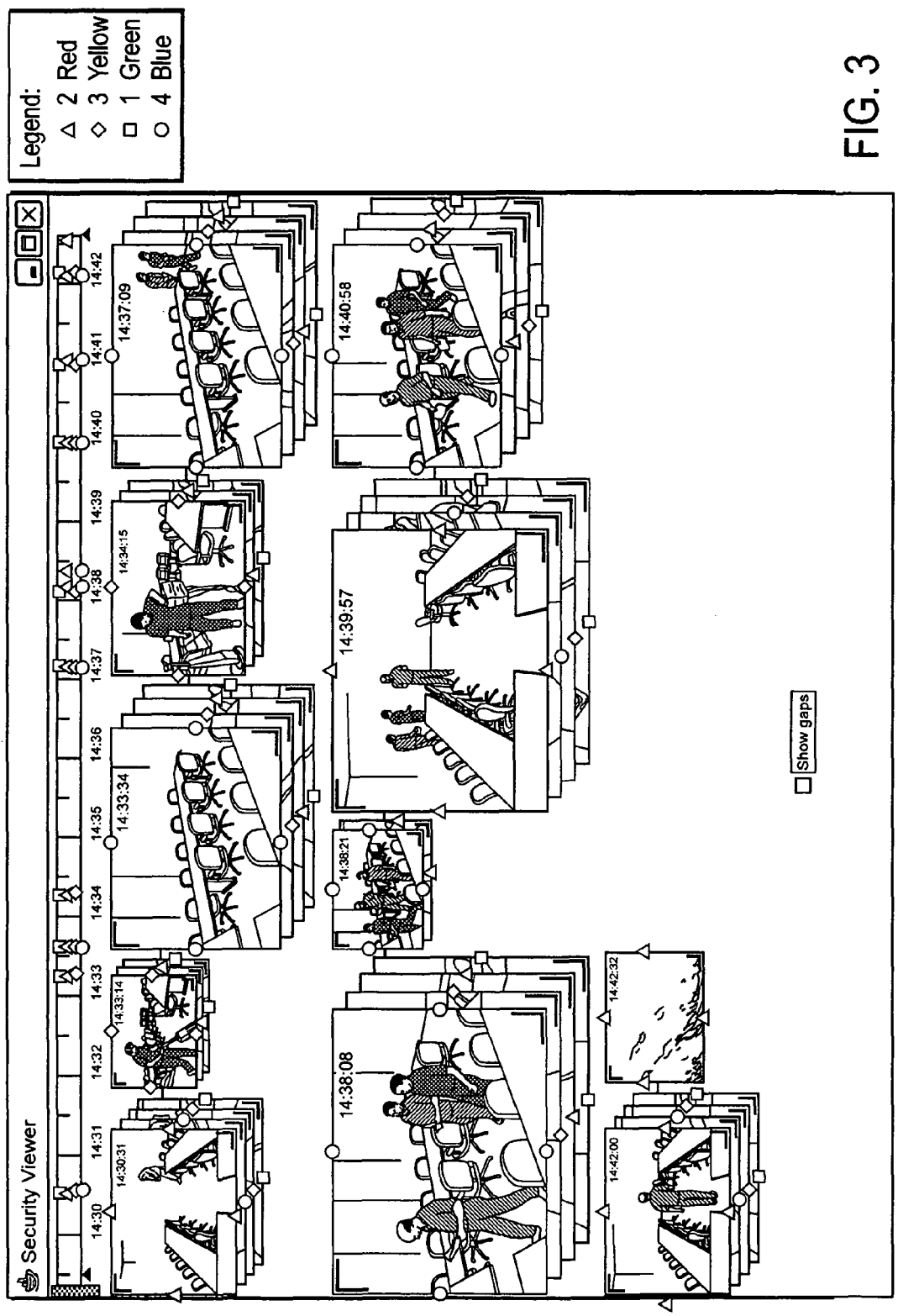
FIG. 3 shows an artists impression of FIG. 10, which illustrates a Manga storyboard summary from four security cameras with keyframes grouped into piles where keyframes are outlined and segments on the timeline are identified with symbols (□, ▲, ◊, ○) corresponding to colors (green, red, yellow, blue) to indicate the source camera (1, 2, 3, 4) respectively.
Figure 10:
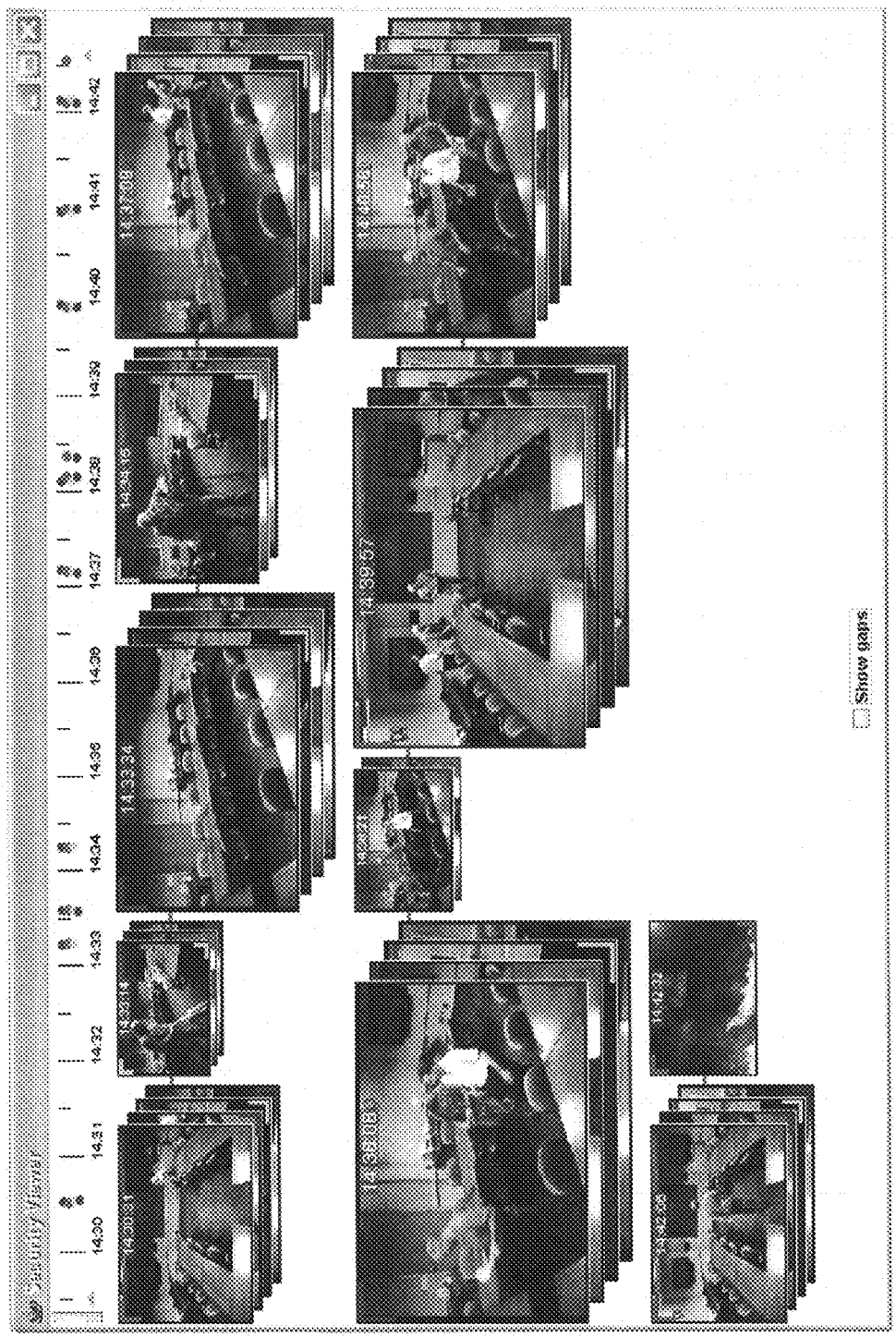
FIG. 10 illustrates a Manga storyboard summary from four security cameras.

Prior work on creating storyboards for a single stream of edited video has been extended to work with multiple synchronized video streams. A single Manga summary for all selected cameras can be created by selecting keyframes from those cameras. Color-coding indicates the source of each keyframe. Simultaneous segments of activity across several video streams are grouped together. With partially overlapping activity segments, groupings are determined that maximize the number of combined video streams that can be visualized by keyframes at approximately the same time. Thick horizontal lines at the bottom of FIGS. 1 and 8 indicate the part of each sub segment that can be lined up with parts of sub segments from other cameras. FIG. 3 and FIG. 10 illustrate a Manga storyboard summary from four security cameras with keyframes grouped into piles, where keyframes are outlined and segments on the timeline are identified in FIG. 3 with symbols (□, Δ, ◊, ○) corresponding to colors (green, red, yellow, blue) to indicate the source camera (1, 2, 3, 4) respectively. For each group, the keyframes are placed in a pile ordered by descending importance such that the most important keyframe can be completely visible and other keyframes can be accessed by mouse movement (see FIGS. 3 and 10).

Figure 4:
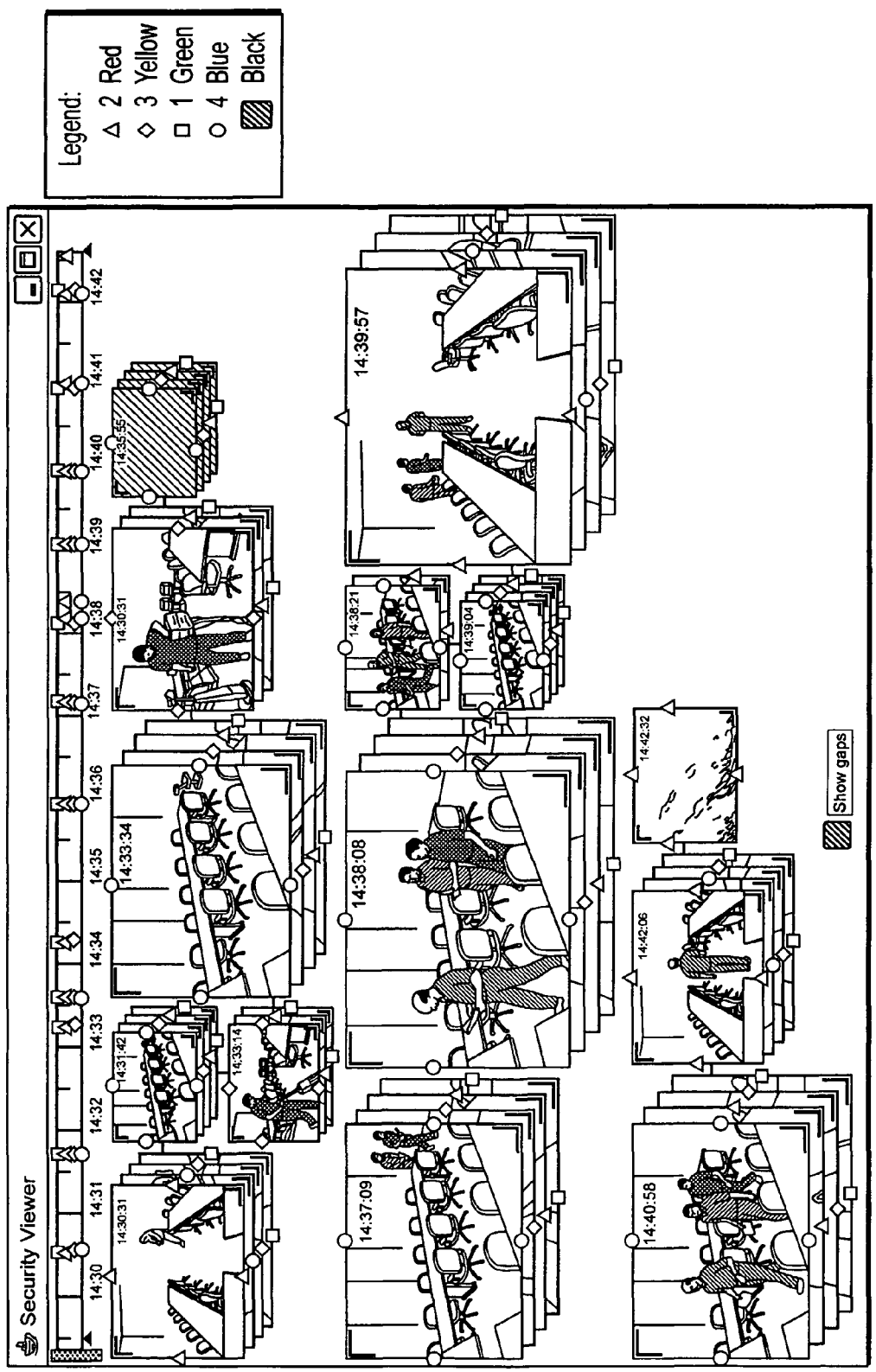
FIG. 4 shows an artists impression of FIG. 11, which illustrates a Manga storyboard summary from four security cameras with keyframes grouped into piles and showing long gaps between segments of activity where keyframes are outlined and segments on the timeline are identified with symbols (□, Δ, ◇, ○) corresponding to colors (green, red, yellow, blue) to indicate the source camera (1, 2, 3, 4) respectively.
Figure 11:
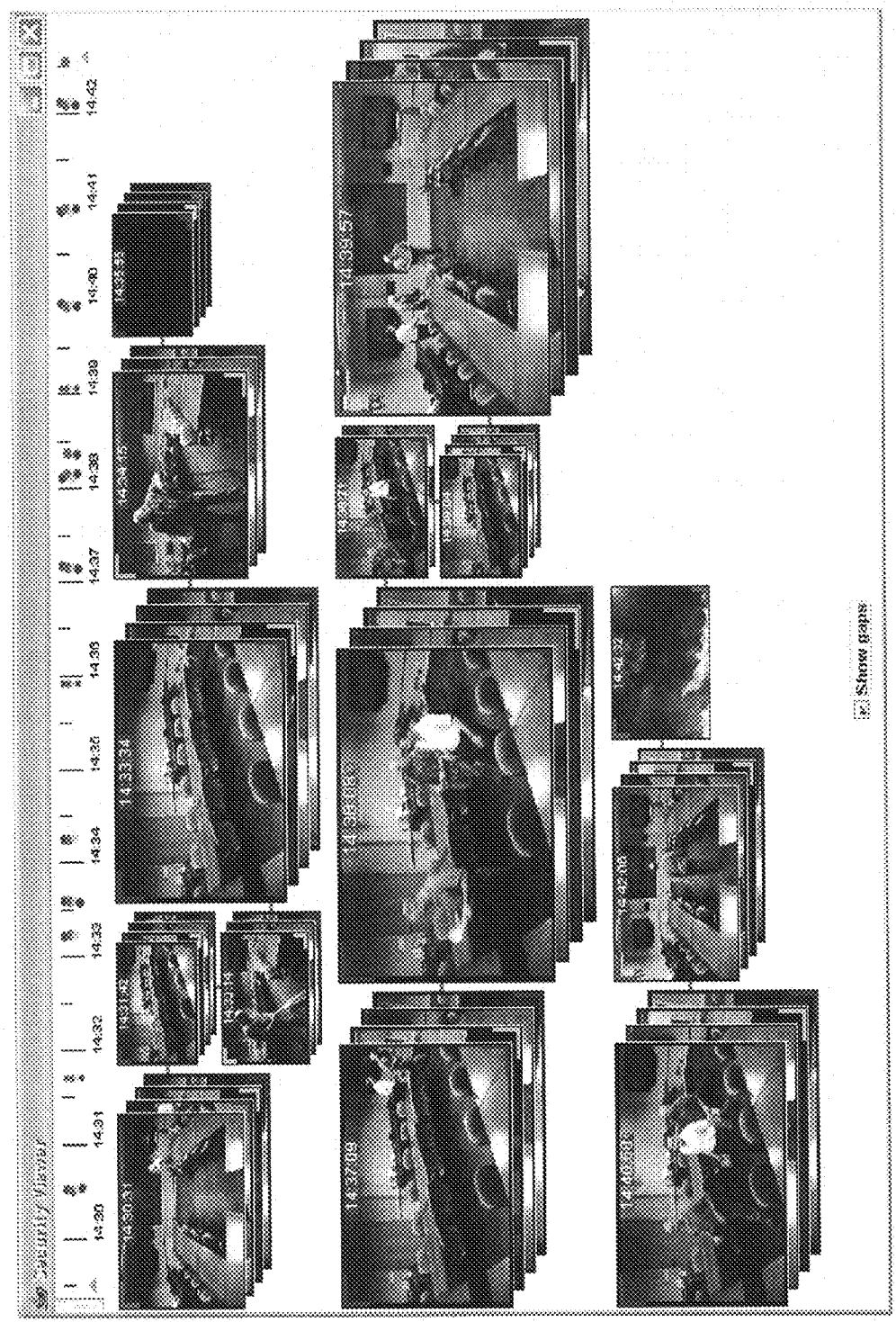
FIG. 11 illustrates a Manga storyboard summary from four security cameras with keyframes grouped into piles and showing long gaps between segments of activity.

While normally only segments of activity are of interest, it can be sometimes beneficial to see what happened in between segments of activity (e.g., when the light was turned off). FIG. 4 and FIG. 11 illustrates a Manga storyboard summary as shown in FIGS. 3 and 10, but showing long gaps between segments of activity where keyframes are outlined and segments on the timeline are identified in FIG. 4 with symbols (□, Δ, ◊, ○) corresponding to colors in FIG. 11 (green, red, yellow, blue) to indicate the source camera (1, 2, 3, 4) respectively. In one embodiment of the invention, a user-selectable option is provided that causes the display of a keyframe from each video stream for each long period of inactivity (see FIGS. 4 and 11).

When moving the mouse to reveal keyframes in piles, additional information such as the source camera location can be displayed as a tool tip attached to the keyframe. This mouse movement can also activate a magnifier display that shows the keyframe under the mouse in more detail. Mouse clicks on keyframes start the playback of the corresponding video segment.

Interaction with Storyboard

Users such as security personnel need to be able to select video streams for inclusion in the storyboard and the time frame of the storyboard. Map and timeline interface components have been designed and developed for these purposes. The map, timeline, and storyboard interact to provide the user with the information necessary to locate video segments of interest.

Timeline of the Video Stream

The timeline shows the timeframe of the current storyboard, allows the user to adjust this timeframe, and indicates the time and video stream of each keyframe included in any way in the storyboard. Controls in the timeline can be used to restrict the interval from which video segments are shown. After changing the interval, the storyboard can be recreated.

Figure 5:
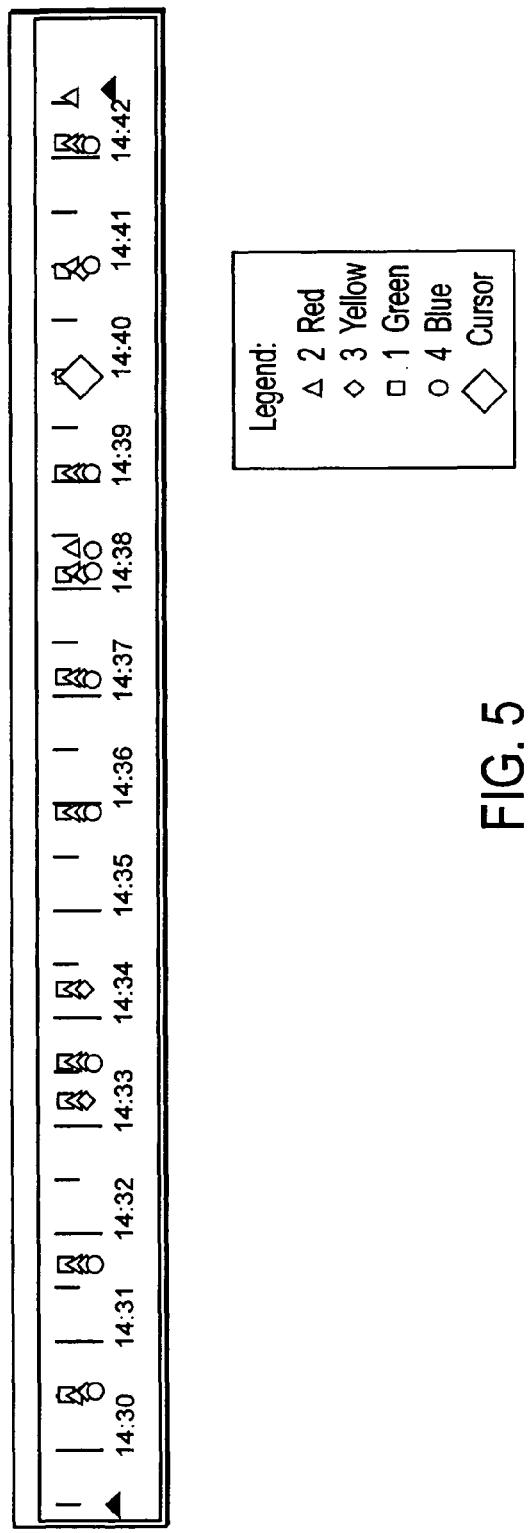
FIG. 5 shows an artists impression of FIG. 12, which illustrates a timeline with symbols indicating times of keyframes from four security cameras where segments on the timeline are identified with symbols (□, Δ, ◇, ○) corresponding to colors (green, red, yellow, blue) to indicate the source camera (1, 2, 3, 4) respectively and the cursor is indicated with a large symbol.
Figure 12:
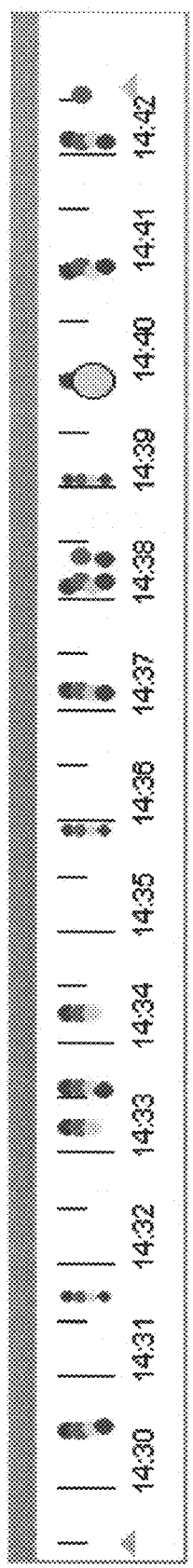
FIG. 12 illustrates a timeline with symbols indicating times of keyframes from four security cameras.

Color-coded dots that correspond to camera colors are placed in the timeline for when a keyframe can be included (where in FIGS. 1-6 symbols are used to indicate colors shown in FIGS. 8-13, where, triangle corresponds with red, diamond with yellow, square with green and circle with blue). FIG. 5 and FIG. 12 illustrate a Timeline indicating times of keyframes from four security cameras, where segments on the timeline are identified in FIG. 5 with symbols (□, Δ, ◊, ○) corresponding to colors in FIG. 12 (green, red, yellow, blue) to indicate the source camera (1, 2, 3, 4) respectively and the cursor is indicated with a large (color) symbol. When the mouse is over a keyframe in the storyboard, a dot in the timeline increases in size to indicate the corresponding time and video stream (see FIGS. 5 and 12). In FIG. 5, the drawing of the invention illustrates the mouse is positioned over a #3 video segment at 14:40 by using a large diamond which should be equated with a large yellow dot in FIG. 12.

Map of the Geographic Position

Figure 6A:
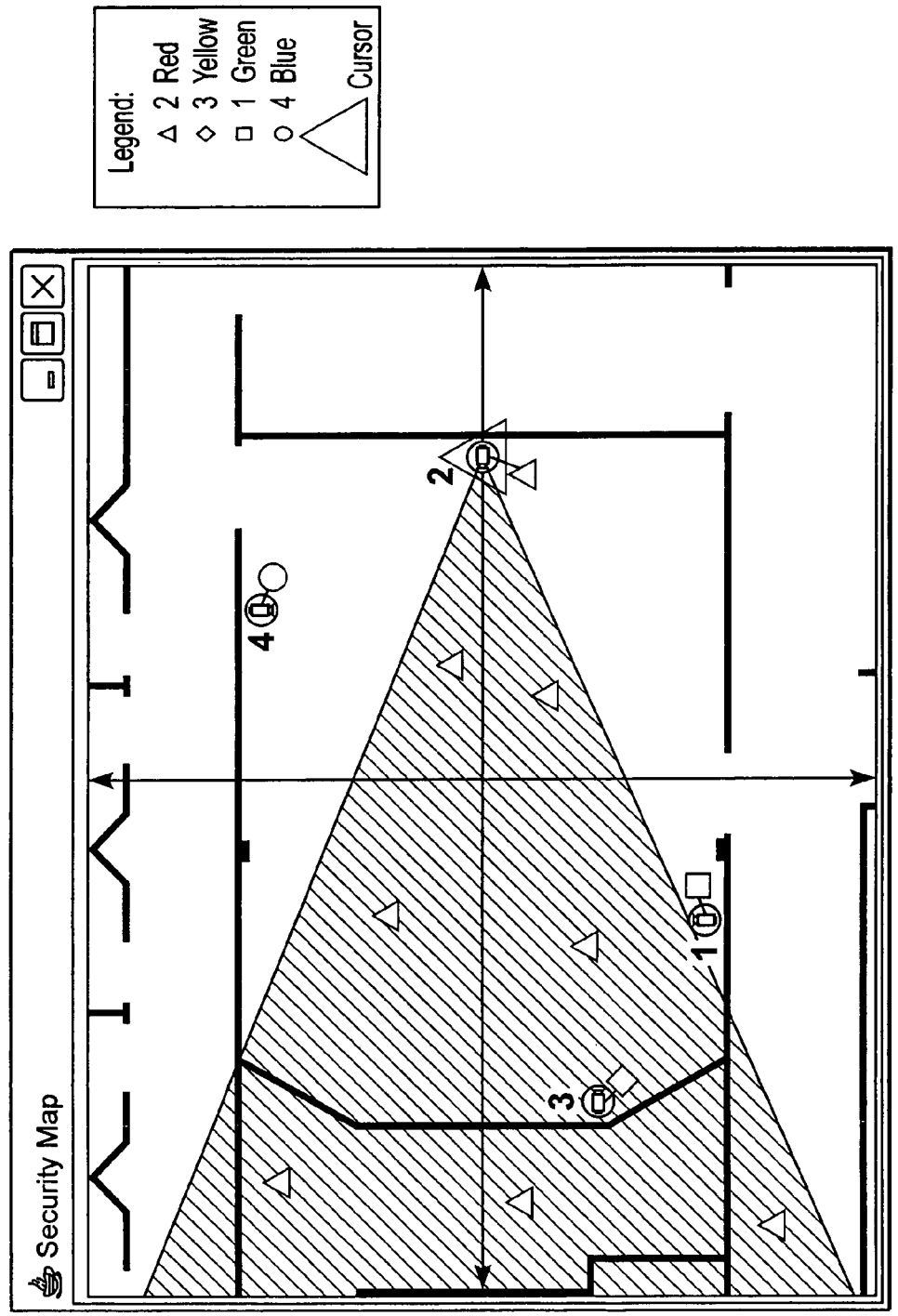
FIG. 6A shows an artists impression of FIG. 13A, where a map showing camera locations and view coverage (diagonal shaded area) when selecting source camera 2 is shown and the position of all cameras is identified with symbols (□, Δ, ◇, ○) corresponding to colors (green, red, yellow, blue) to indicate the camera (1, 2, 3, 4) respectively.
Figure 6B:
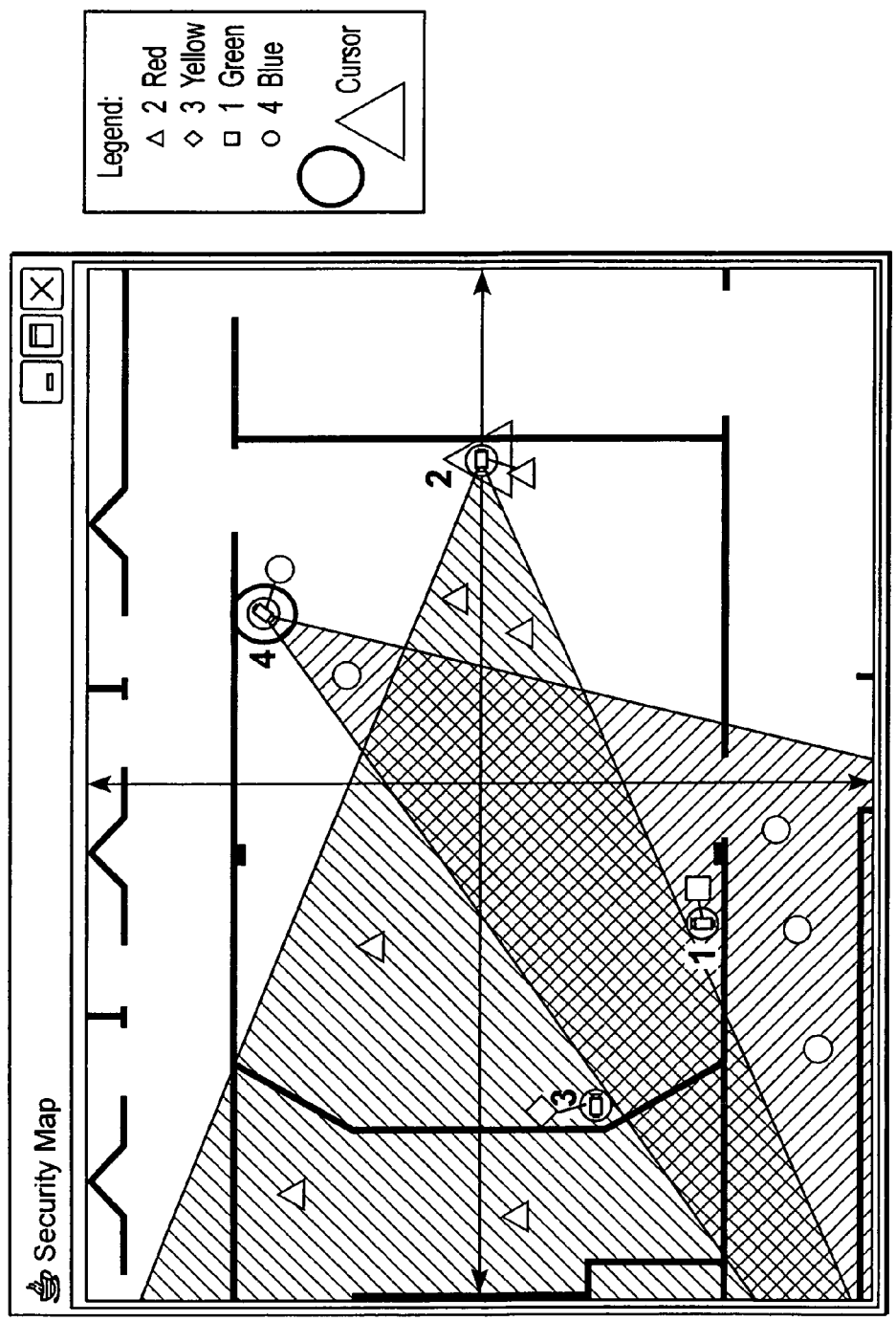
FIG. 6B shows an artists impression of FIG. 13B, where a map showing camera locations and view coverage of source cameras 2 and 4 are selected and the position of all cameras identified with symbols (□, Δ, ◇, ○) corresponding to colors (green, red, yellow, blue) to indicate the camera (1, 2, 3, 4) respectively.
Figure 13A:
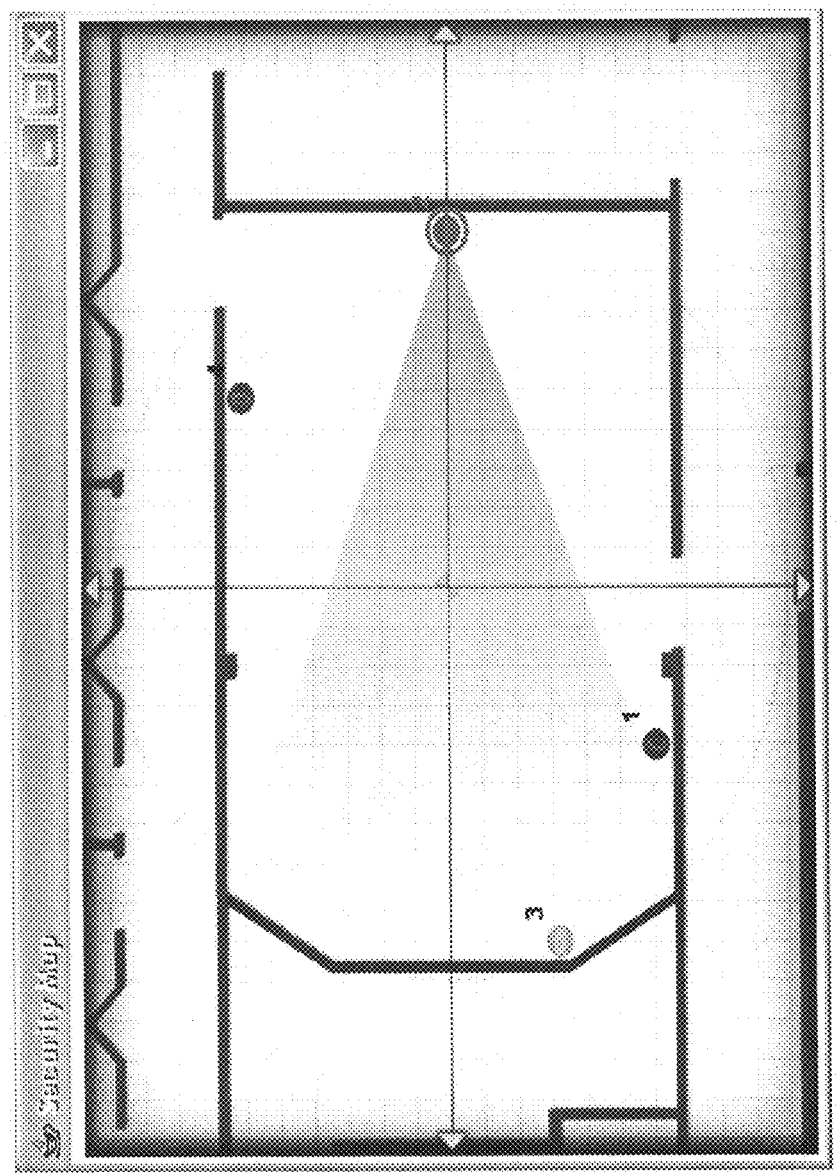
FIG. 13A shows a map displaying camera locations and view coverage when source camera 2 is selected.
Figure 13B:
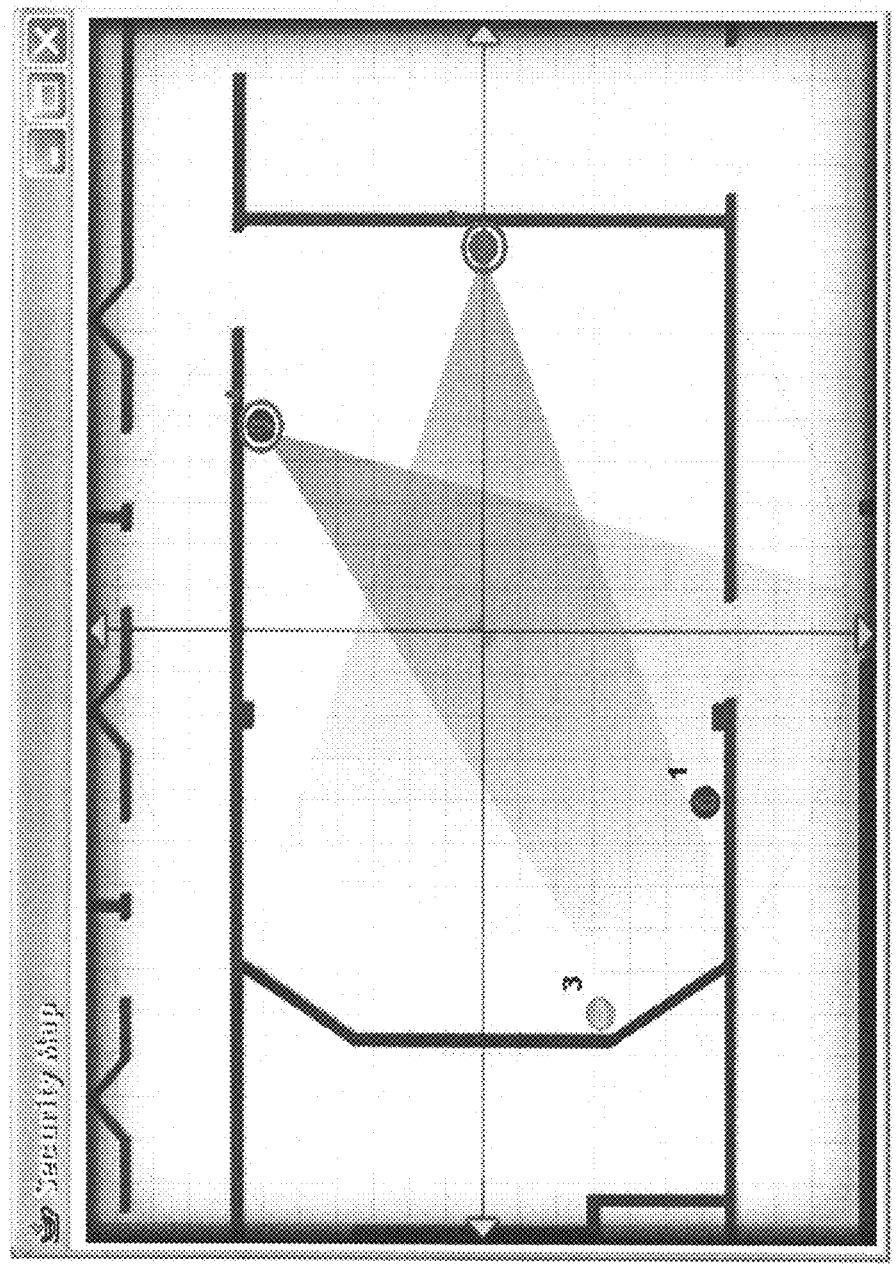
FIG. 13B shows a map displaying camera locations and view coverage of source cameras 2 and 4.

The map shows the geographic position of the cameras and their fields of view (shaded areas in FIG. 6 and FIG. 13). It can be used for selecting video streams (identified by large symbols in FIGS. 6 and 13) to include in the storyboard. Cameras are identified using symbols, color-coding and textual camera identifiers (see FIGS. 6 and 13). When a user selects a set of cameras with the mouse, the storyboard can be recreated.

One embodiment of the invention is a method of identifying uninterrupted and/or interesting activity segments in a video stream comprising the steps of: (a) dividing a video stream into more than one segment; where each segment is made up of a group of video frames in which activity is present; (b) determining one or more characteristics present in one or more segments; (c) determining one or more thresholds based on the characteristics; and (d) selecting uninterrupted and/or interesting activity segments based on the thresholds.

In one embodiment of the invention in step (a) activity is determined by comparing successive video frames.

In another embodiment of the invention in step (a) activity is determined by comparing foreground pixels in video frames.

In one embodiment of the invention, step (a) further comprises the steps of: (e) determining major segments in the video stream; wherein major segments correspond with major changes; (f) dividing major segments into two or more segments based on the activity within the segments; (g) determining the length of duration of the activity in the segments; and (h) splitting, merging or deleting the segments based on the length of duration of the activity in the segments.

In one embodiment of the invention, in step (b) the characteristic is selected from the set consisting of pixels that change close in space to a designated motion, pixels that change close in time to events of uninterrupted activity, pixels that change close in time to events of interesting activity, pixels that change close in time to events of importance, pixels that change close in space to stationary points of interest, pixels that change close in space to moving points of interest, pixels that change in successive frames, the number of foreground pixels, the direction of motion in the changed pixels, the direction of motion in the foreground pixels, the speed of overall motion in the changed pixels and the speed of overall motion in the foreground pixels.

In one embodiment of the invention in step (c) the thresholds to be determined are selected from the group consisting of the minimum fraction of changed pixels to be considered activity, the minimum pause in activity to start a new video segment, the minimum length of the segment to ignore noise and the proximity to a point of interest.

In one embodiment of the invention, step (d) further comprises: (i) comparing the number of changed pixels in the segment with the 'minimum fraction of changed pixels to be considered activity' threshold in order to discard segments; (j) comparing the longest gap of inactivity between segments with the 'minimum pause in activity to start a new video segment' threshold in order to merge segments; and (k) comparing the length of segments with the 'minimum length of the segment' threshold in order to discard segments.

In one embodiment of the invention in step (d) the number of occurrences of the characteristics are compared with the thresholds to discard, merge and split segments.

In one embodiment of the invention in step (e) major changes comprise changes in lighting, daylight to twilight, nighttime to daybreak, weather, emergency alert and alarm conditions.

In one embodiment of the invention in step (f) the criterion for activity is selected from the set consisting of the proximity to a point of interest, the number of foreground pixels, the number of pixels that change in successive frames, the direction of motion in changed pixels, the direction of motion in foreground pixels, the speed of overall motion in changed pixels and the speed of overall motion in foreground pixels.

In one embodiment of the invention the method further comprises the step of plotting importance of the identified uninterrupted and/or interesting activity versus time.

In one embodiment of the invention the importance is determined based on one or more criteria selected from the group consisting of the amount of activity in the video, motion close to one or more stationary points of interest, motion close to one or more moving points of interest, pixels that change in successive frames, the number of foreground pixels, the direction of motion in the changed pixels, the direction of motion in the foreground pixels, the speed of overall motion in the changed pixels, the speed of overall motion in the foreground pixels and events from other sensors.

In another embodiment of the invention a method for constructing a Manga storyboard of uninterrupted and/or interesting activity in a video stream comprises the steps of: (a) dividing a video stream into one or more segments based on one or more criteria; (b) selecting segments of uninterrupted and/or interesting activity based on one or more criteria; and (c) displaying the selected segments.

In another embodiment of the invention the criteria are selected from the group consisting of the time duration of uninterrupted activity in the segment, the time duration of interesting activity in the segment, the time duration of uninterrupted and interesting activity in the segment, the cumulative time duration of uninterrupted activity in the stream, the cumulative time duration of uninterrupted activity in the segment, the cumulative time duration of interesting activity in the segment, the cumulative time duration of uninterrupted and interesting activity in the segment, the amount of uninterrupted activity in the cumulative segments, the amount of interesting activity in the cumulative segments, the amount of uninterrupted and interesting activity in the cumulative segments, the time duration of the stream, the time duration of the major segment of uninterrupted activity in the stream, the time duration of the major segment of interesting activity in the stream, the time duration of the major segment of uninterrupted and interesting activity in the stream, the cumulative time duration of uninterrupted activity in the stream, the cumulative time duration of interesting activity in the stream, the cumulative time duration of uninterrupted and interesting activity in the stream, the amount of uninterrupted activity in the stream, the amount of interesting activity in the stream, the amount of uninterrupted and interesting activity in the stream, motion close to points of interest, pixels that change in successive frames, the number of foreground pixels, the direction of motion in the changed pixels, the direction of motion in the foreground pixels, the speed of overall motion in the changed pixels, the speed of overall motion in the foreground pixels and events from other sensors.

In another embodiment of the invention the method further comprises the steps of: (d) depicting the uninterrupted and/or interesting activity of two or more video streams; (e) visualizing the selected segments using one or more keyframes; wherein the camera used to film the video stream can be correlated with the keyframe using a code; (f) varying the size of the keyframes to depict importance of the uninterrupted and/or interesting activity.

In another embodiment of the invention two or more colors are used as the code; wherein a selected color is used to correlate a keyframe representing a segment corresponding to the video stream taken with a camera.

In another embodiment of the invention the method further comprises the step of depicting importance of the segments.

In another embodiment of the invention the method further comprises the step of: (g) depicting the importance of two or more video streams; wherein two or more colors are used as a code; wherein a selected color is used to correlate the importance of segments from a video stream taken with a camera; and (h) depicting keyframes corresponding to segments of high importance.

In another embodiment of the invention a map is used to show the geographic position of one or more cameras used to film the one or more video streams; where a code is used to indicate the camera position used to video the video stream; wherein the code correlates with the code used in the Manga storyboard.

In another embodiment of the invention a timeline is used to show one or more video streams; wherein a color is used to indicate a video stream; wherein the color correlates with the color used in the Manga storyboard.

In another embodiment of the invention keyframes are stacked in piles for indicating simultaneous uninterrupted and/or interesting activity.

In another embodiment of the invention selecting a keyframe can be used to initiate a command selected from the group consisting of magnify the display, play the corresponding video segment and play the corresponding video.

In another embodiment of the invention the video can be accessed through the Manga storyboard.

In another embodiment of the invention the layout of the Manga storyboard preserves the connection between interface elements for selecting cameras and periods of interest.

Another embodiment of the invention can be a method for constructing a Manga storyboard of uninterrupted and/or interesting activity in a video stream comprising the steps of: (a) dividing a video stream into one or more segments based on the presence of activity in successive video frames and/or activity in foreground pixels in video frame; (b) selecting segments of uninterrupted and/or interesting activity based on criteria selected from the group consisting of the minimum fraction of changed pixels to be considered activity, the minimum pause in activity to start a new video segment, the minimum length of the segment to ignore noise and the proximity to a point of interest; wherein horizontal lines are used to indicate segments of uninterrupted and/or interesting activity; (c) displaying the selected segments using one or more keyframes; and (d) depicting the importance of the segment; wherein the layout of the Manga storyboard preserves the connection between keyframe size and importance.

In an alternative embodiment of the invention a program of instructions executable by a computer to identify uninterrupted and/or interesting activity comprising the steps of: (a) dividing a video stream into segments based on one or more criteria; (b) selecting segments of uninterrupted and/or interesting activity; (c) displaying the selected segments using keyframes; and (d) depicting the importance of the uninterrupted and/or interesting activity.

In an alternative embodiment of the invention a system or apparatus for generating a Manga storyboard of uninterrupted and/or interesting activity from a video stream, wherein generating the Manga storyboard comprises: a) one or more processors capable of specifying one or more sets of parameters; capable of transferring the one or more sets of parameters to a source code; capable of compiling the source code into a series of tasks for visualizing an event in a video stream; and b) a machine readable medium including operations stored thereon that when processed by one or more processors cause a system to perform the steps of specifying one or more sets of parameters; transferring one or more sets of parameters to a source code; compiling the source code into a series of tasks for generating the Manga storyboard of uninterrupted and/or interesting activity from a video stream.

In an alternative embodiment of the invention a device for generating a Manga storyboard of uninterrupted and/or interesting activity, comprising: (a) means for dividing a video stream into segments based on one or more criteria; (b) means for selecting segments of uninterrupted and/or interesting activity; (c) means for displaying the selected segments using keyframes; and (d) means for depicting the importance of the displayed segments.

In an alternative embodiment of the invention a machine-readable medium having instructions stored thereon, to cause a system to: (a) divide a video stream into segments based on one or more criteria; (b) select segments of uninterrupted and/or interesting activity; (c) display the selected segments using keyframes; and (d) depict the importance of the displayed segments.

Various embodiments of the invention may be implemented using a processor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits and/or by interconnecting an appropriate network of component circuits, as will be readily apparent to those skilled in the art.

Various embodiments include a computer program product which can be a storage medium (media) having instructions and/or information stored thereon/in which can be used to program a general purpose or specialized computing processor(s)/device(s) to perform any of the features presented herein. The storage medium can include, but is not limited to, one or more of the following: any type of physical media including floppy disks, optical discs, DVDs, CD-ROMs, micro drives, magneto-optical disks, holographic storage devices, ROMs, RAMs, EPROMs, EEPROMs, DRAMs, PRAMS, VRAMs, flash memory devices, magnetic or optical cards, nano-systems (including molecular memory ICs); paper or paper-based media; and any type of media or device suitable for storing instructions and/or information. Various embodiments include a computer program product that can be transmitted in whole or in parts and over one or more public and/or private networks wherein the transmission includes instructions and/or information, which can be used by one or more processors to perform any of the features, presented herein. In various embodiments, the transmission may include a plurality of separate transmissions.

Stored on one or more computer readable media, the present disclosure includes software for controlling the hardware of the processor(s), and for enabling the computer(s) and/or processor(s) to interact with a human user or other device utilizing the results of the present invention. Such software may include, but is not limited to, device drivers, interface drivers, operating systems, execution environments/containers, user interfaces and applications.

The execution of code can be direct or indirect. The code can include compiled, interpreted and other types of languages. Unless otherwise limited by claim language, the execution and/or transmission of code and/or code segments for a function can include invocations or calls to other software or devices, local or remote, to do the function. The invocations or calls can include invocations or calls to library modules, device drivers, interface drivers and remote software to do the function. The invocations or calls can include invocations or calls in distributed and client/server systems.

What is claimed is:

1. A method of, at a computer system including one or more processors and memory, identifying uninterrupted and/or interesting activity segments in a video stream comprising:
dividing multiple video streams from multiple cameras into a plurality of activity segments, wherein each activity segment is made up of a group of video frames from a respective video stream in which activity is present;
determining one or more characteristics present in the activity segments that indicate activity close in space to a designated motion or point of interest, wherein the activity is determined to be close in space to a designated motion or point of interest by comparing views of a plurality of the cameras to determine a distance of activity from the designated motion or point of interest; and
selecting one or more of the plurality of activity segments as uninterrupted and/or interesting activity segments based on the determined characteristics.

2. The method of claim 1, wherein a presence of activity in a group of video frames is determined by comparing successive video frames.

3. The method of claim 1, wherein dividing a respective video stream of the multiple video streams into activity segments further comprises:
determining major segments in the respective video stream, wherein a boundary of a major segment corresponds with major changes;
dividing major segments into two or more segments based on the activity within the segments;
determining the length of duration of the activity in the segments; and
splitting, merging or deleting the segments based on the length of duration of the major changes and the activity in the segments so as to generate the plurality of activity segments.

4. The method of claim 3, wherein the major changes are selected from the group consisting of: changes in lighting, daylight to twilight, night-time to daybreak, changes in weather, changes in emergency alert, and changes in alarm conditions.

5. The method of claim 1, wherein the one or more characteristics are selected from the group consisting of: pixels that change close in space to a designated motion, pixels that change close in space to stationary points of interest, and pixels that change close in space to moving points of interest.

6. The method of claim 1, wherein a respective activity segment is selected as an uninterrupted and/or interesting activity when the determined characteristics meet a threshold selected from the group consisting of: a minimum fraction of changed pixels to be considered activity, a minimum pause in activity to start a new video segment, a minimum length of the segment to ignore noise, and a proximity to a point of interest.

7. The method of claim 6, wherein the selection further comprises:
comparing the number of changed pixels in the segment with the 'minimum fraction of changed pixels to be considered activity' threshold in order to discard segments;

comparing the longest gap of inactivity between segments with the 'minimum pause in activity to start a new video segment' threshold in order to merge segments; and comparing the length of segments with the 'minimum length of the segment' threshold in order to discard segments.

8. The method of claim 6, wherein a number of occurrences of a respective characteristic is compared with a respective threshold to discard, merge and split segments.

9. The method of claim 1, further comprising the step of plotting importance of the identified uninterrupted and/or interesting activity versus time; wherein the importance is determined based on one or more criteria selected from the group consisting of:

the amount of activity in the video, motion close to one or more stationary points of interest, motion close to one or more moving points of interest, pixels that change in successive frames, the number of foreground pixels, the direction of motion in the changed pixels, the direction of motion in the foreground pixels, the speed of overall motion in the changed pixels, the speed of overall motion in the foreground pixels, and events from other sensors.

10. The method of claim 1, further comprising:

displaying a representation of the selected uninterrupted and/or interesting activity segments in a storyboard.

11. The method of claim 10, wherein:

the one or more activity segments are selected as segments of uninterrupted and/or interesting activity based on one or more criteria; and the criteria are selected from the group consisting of: the time duration of uninterrupted activity in the segment, the time duration of interesting activity in the segment, the time duration of uninterrupted and interesting activity in the segment, the cumulative time duration of uninterrupted activity in the stream, the cumulative time duration of uninterrupted activity in the segment, the cumulative time duration of interesting activity in the segment, the cumulative time duration of uninterrupted and interesting activity in the segment, the amount of uninterrupted activity in the cumulative segments, the amount of interesting activity in the cumulative segments, the amount of uninterrupted and interesting activity in the cumulative segments, the time duration of the stream, the time duration of the major segment of uninterrupted activity in the stream, the time duration of the major segment of interesting activity in the stream, the time duration of the major segment of uninterrupted and interesting activity in the stream, the cumulative time duration of uninterrupted activity in the stream, the cumulative time duration of interesting activity in the stream, the cumulative time duration of uninterrupted and interesting activity in the stream, the amount of uninterrupted activity in the stream, the amount of interesting activity in the stream, the amount of uninterrupted and interesting activity in the stream, motion close to points of interest, pixels that change in successive frames, the number of foreground pixels, the direction of motion in the changed pixels, the direction of motion in the foreground pixels, the speed of overall motion in the changed pixels, the speed of overall motion in the foreground pixels, and events from other sensors.

12. The method of claim 10, further comprising:

depicting the uninterrupted and/or interesting activity of two or more of the multiple video streams;

visualizing the selected activity segments using one or more keyframes, wherein the camera used to film the video stream can be correlated with the keyframe using a code; and varying the size of the keyframes to depict importance of the uninterrupted and/or interesting activity.

13. The method of claim 12, wherein:

two or more colors are used as the code; and a selected color is used to correlate a keyframe representing an activity segment corresponding to the video stream taken with a camera.

14. The method of claim 13, wherein:

a map is used to show the geographic position of one or more cameras used to film the one or more video streams;

code is used to indicate the camera position used to film the video stream; and the code correlates with the code used in the storyboard.

15. The method of claim 13, wherein:

a timeline is used to show one or more video streams;

a color is used to indicate a video stream; and the color correlates with the color used in the storyboard.

16. The method of claim 13, wherein the method further comprises one or more steps selected from the set consisting of: stacking keyframes in piles for indicating simultaneous uninterrupted and/or interesting activity from a plurality of the video streams, accessing the video through the storyboard, and preserving the connection between interface elements for selecting cameras and periods of interest via the layout of the storyboard.

17. The method of claim 13, wherein selecting a keyframe can be used to initiate a command selected from the group consisting of: magnify the display, play the corresponding activity segment, and play the corresponding video.

18. The method of claim 10, wherein the method further comprises depicting importance of the activity segments which can be accomplished by carrying out one or more steps selected from the group consisting of: displaying the camera corresponding to the important activity segment, displaying a code indicating the importance of keyframes, displaying the activity segment in the keyframe, and varying the size of the keyframe.

19. A computer system, comprising:

one or more processors;

memory; and one or more programs stored in the memory, the one or more programs comprising instructions for:

dividing multiple video streams from multiple cameras into a plurality of activity segments, wherein each activity segment is made up of a group of video frames from a respective video stream in which activity is present;

determining one or more characteristics present in the activity segments that indicate activity close in space to a designated motion or point of interest, wherein the activity is determined to be close in space to a designated motion or point of interest by comparing views of a plurality of the cameras to determine a distance of activity from the designated motion or point of interest; and selecting one or more of the plurality of activity segments as uninterrupted and/or interesting activity segments based on the determined characteristics.

20. The computer system of claim 19, wherein the instructions for dividing a respective video stream of the multiple video streams into activity segments further comprise instructions for:

determining major segments in the respective video stream, wherein a boundary of a major segment corresponds with major changes;

dividing major segments into two or more segments based on the activity within the segments;

determining the length of duration of the activity in the segments; and splitting, merging or deleting the segments based on the length of duration of the major changes and the activity in the segments so as to generate the plurality of activity segments.

21. The computer system of claim 20, wherein the major changes are selected from the group consisting of: changes in lighting, daylight to twilight, night-time to daybreak, changes in weather, changes in emergency alert, and changes in alarm conditions.

22. The computer system of claim 19, wherein a respective activity segment is selected as an uninterrupted and/or interesting activity when the determined characteristics meet a threshold selected from the group consisting of: a minimum fraction of changed pixels to be considered activity, a minimum pause in activity to start a new video segment, a minimum length of the segment to ignore noise, and a proximity to a point of interest.

23. The computer system of claim 22, wherein the instructions for selecting further comprise instructions for:

comparing the number of changed pixels in the segment with the 'minimum fraction of changed pixels to be considered activity' threshold in order to discard segments;

comparing the longest gap of inactivity between segments with the 'minimum pause in activity to start a new video segment' threshold in order to merge segments; and comparing the length of segments with the 'minimum length of the segment' threshold in order to discard segments.

24. The computer system of claim 19, further comprising instructions for plotting importance of the identified uninterrupted and/or interesting activity versus time; wherein the importance is determined based on one or more criteria selected from the group consisting of:

the amount of activity in the video, motion close to one or more stationary points of interest, motion close to one or more moving points of interest, pixels that change in successive frames, the number of foreground pixels, the direction of motion in the changed pixels, the direction of motion in the foreground pixels, the speed of overall motion in the changed pixels, the speed of overall motion in the foreground pixels, and events from other sensors.

25. A non-transitory computer readable storage medium storing one or more programs configured for execution by a computer system, the one or more programs comprising instructions to:

divide multiple video streams from multiple cameras into a plurality of activity segments, wherein each activity segment is made up of a group of video frames from a respective video stream in which activity is present;

determine one or more characteristics present in the activity segments that indicate activity close in space to a designated motion or point of interest, wherein the activity is determined to be close in space to a designated motion or point of interest by comparing views of a plurality of the cameras to determine a distance of activity from the designated motion or point of interest; and select one or more of the plurality of activity segments as uninterrupted and/or interesting activity segments based on the determined characteristics.

26. The computer readable storage medium of claim 25, wherein the instructions to divide a respective video stream of the multiple video streams into activity segments further comprise instructions to:

determine major segments in the respective video stream, wherein a boundary of a major segment corresponds with major changes;

divide major segments into two or more segments based on the activity within the segments;

determine the length of duration of the activity in the segments; and split, merge or delete the segments based on the length of duration of the major changes and the activity in the segments so as to generate the plurality of activity segments.

27. The computer readable storage medium of claim 26, wherein the major changes are selected from the group consisting of: changes in lighting, daylight to twilight, night-time to daybreak, changes in weather, changes in emergency alert, and changes in alarm conditions.

28. The computer readable storage medium of claim 25, wherein a respective activity segment is selected as an uninterrupted and/or interesting activity when the determined characteristics meet a threshold selected from the group consisting of: a minimum fraction of changed pixels to be considered activity, a minimum pause in activity to start a new video segment, a minimum length of the segment to ignore noise, and a proximity to a point of interest.

29. The computer readable storage medium of claim 28, wherein the instructions to select further comprise instructions to:

compare the number of changed pixels in the segment with the 'minimum fraction of changed pixels to be considered activity' threshold in order to discard segments;

compare the longest gap of inactivity between segments with the 'minimum pause in activity to start a new video segment' threshold in order to merge segments; and compare the length of segments with the 'minimum length of the segment' threshold in order to discard segments.

30. The computer readable storage medium of claim 25, further comprising instructions to plot importance of the identified uninterrupted and/or interesting activity versus time; wherein the importance is determined based on one or more criteria selected from the group consisting of: the amount of activity in the video, motion close to one or more stationary points of interest, motion close to one or more moving points of interest, pixels that change in successive frames, the number of foreground pixels, the direction of motion in the changed pixels, the direction of motion in the foreground pixels, the speed of overall motion in the changed pixels, the speed of overall motion in the foreground pixels, and events from other sensors.

31. A method of, at a computer system including one or more processors and memory, identifying uninterrupted and/or interesting activity segments in a video stream comprising:

dividing multiple video streams from multiple cameras into a plurality of activity segments, wherein each activity segment is made up of a group of video frames from a respective video stream in which activity is present;

determining one or more characteristics present in the activity segments that indicate activity close in space to a designated motion or point of interest;

selecting one or more of the plurality of activity segments as uninterrupted and/or interesting activity segments based on the determined characteristics; and displaying a representation of the selected uninterrupted and/or interesting activity segments in a storyboard, wherein the displaying includes:
depicting the uninterrupted and/or interesting activity of two or more of the multiple video streams;
visualizing the selected activity segments using one or more keyframes, wherein the camera used to film the video stream can be correlated with the keyframe using a code, wherein two or more colors are used as the code and a selected color is used to correlate a keyframe representing an activity segment corresponding to the video stream taken with a camera; and
varying the size of the keyframes to depict importance of the uninterrupted and/or interesting activity.

* * * * *